United States Patent
Yu et al.

(10) Patent No.: US 12,095,058 B2
(45) Date of Patent: Sep. 17, 2024

(54) METHOD FOR PREPARING COPPER-BASED NEGATIVE ELECTRODE MATERIAL BY USING WASTE BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/289,053

(22) PCT Filed: Aug. 25, 2022

(86) PCT No.: PCT/CN2022/114926
§ 371 (c)(1),
(2) Date: Oct. 31, 2023

(87) PCT Pub. No.: WO2023/093162
PCT Pub. Date: Jun. 1, 2023

(65) Prior Publication Data
US 2024/0222732 A1 Jul. 4, 2024

(30) Foreign Application Priority Data
Nov. 24, 2021 (CN) .......................... 202111402943.3

(51) Int. Cl.
*H01M 10/54* (2006.01)
*C25D 3/56* (2006.01)
(Continued)

(52) U.S. Cl.
CPC ............ *H01M 10/54* (2013.01); *C25D 3/562* (2013.01); *C25D 5/50* (2013.01); *C25D 7/0614* (2013.01); *C25D 21/12* (2013.01); *C25D 21/18* (2013.01)

(58) Field of Classification Search
CPC ......... H01M 10/54; C25D 3/562; C25D 5/50; C25D 7/0614; C25D 21/12; C25D 21/18
See application file for complete search history.

(56) References Cited

U.S. PATENT DOCUMENTS

| | | | |
|---|---|---|---|
| 2015/0030873 A1* | 1/2015 | Cheng | C25D 3/38 428/606 |
| 2016/0045841 A1* | 2/2016 | Kaplan | C01B 32/05 429/49 |
| 2017/0005374 A1* | 1/2017 | Brouwer | C22B 26/12 |

FOREIGN PATENT DOCUMENTS

| | | |
|---|---|---|
| CN | 105552469 A | 5/2016 |
| CN | 106025421 | * 10/2016 |

(Continued)

OTHER PUBLICATIONS

CN 106207301MT (Year: 2016).*
(Continued)

*Primary Examiner* — Alexander Usyatinsky
(74) *Attorney, Agent, or Firm* — MYERS WOLIN, LLC

(57) ABSTRACT

A method for preparing a copper-based anode material from a waste battery includes the following steps: (1) disassem-
(Continued)

bling a waste battery and taking out an anode plate; (2) using the anode plate in step (1) as an anode and taking a copper foil current collector as a cathode, and placing the anode and the cathode in an electroplating solution for electroplating; (3) after the electroplating is completed, collecting anode powder separated from the anode and soaking the copper foil current collector in an acid solution; (4) washing and drying the soaked copper foil current collector; and (5) calcinating the copper foil current collector to obtain a copper-base anode material.

8 Claims, 1 Drawing Sheet

(51) Int. Cl.
*C25D 5/50* (2006.01)
*C25D 7/06* (2006.01)
*C25D 21/12* (2006.01)
*C25D 21/18* (2006.01)

(56) References Cited

FOREIGN PATENT DOCUMENTS

| CN | 106025421 | A | 10/2016 |
|---|---|---|---|
| CN | 106129513 | A | 11/2016 |
| CN | 106207301 | * | 12/2016 |
| CN | 106207301 | A | 12/2016 |
| CN | 107317048 | * | 11/2017 |
| CN | 107317048 | A | 11/2017 |
| CN | 114079095 | A | 2/2022 |
| JP | 2012-229481 | A | 11/2012 |
| WO | 2015/192743 | A1 | 12/2015 |

OTHER PUBLICATIONS

CN 107317048 MT (Year: 2017).*
The Notification to grant a Patent issued by SIPO for Application No. 202111402943.3 (Year: 2024).*
First Office Action and Search Report issued by the China National Intellectual Property Administration for Chinese Patent Application No. 202111402943.3, mailed on Jan. 6, 2024, with an English translation.
Notification to grant patent right for invention issued by the China National Intellectual Property Administration for Chinese Patent Application No. 202111402943.3, mailed on Feb. 6, 2024, with an English translation.
International Search Report and Written Opinion of the International Searching Authority issued by the China National Intellectual Property Administration for International Patent Application No. PCT/CN2022/114926, mailed on Nov. 28, 2022, with an English translation of the International Search Report and conclusions from the Written Opinion.

* cited by examiner

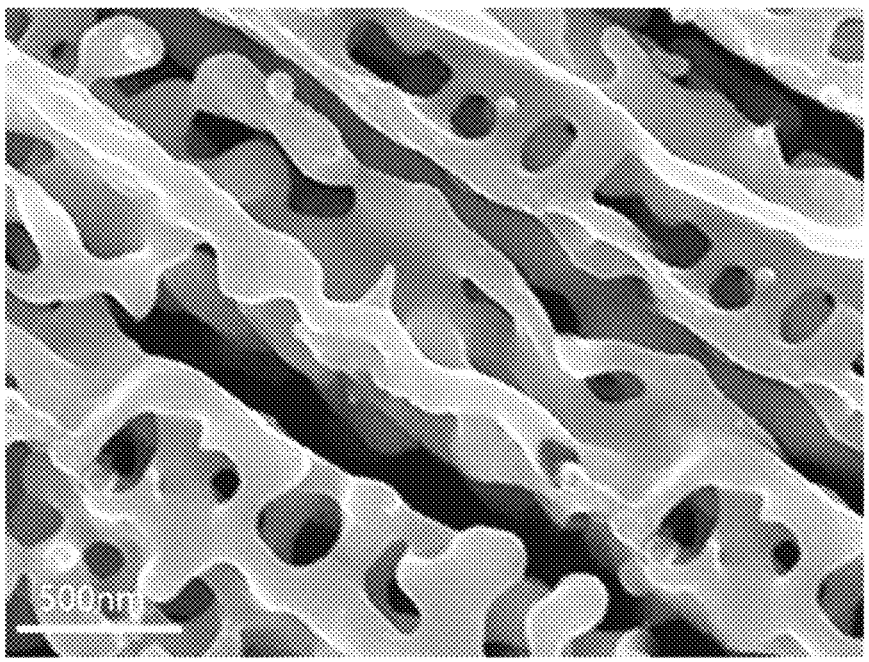

METHOD FOR PREPARING COPPER-BASED NEGATIVE ELECTRODE MATERIAL BY USING WASTE BATTERY

CROSS-REFERENCE TO RELATED APPLICATION

This application is a national stage filing under 35U.S.C. § 371 of international application number PCT/CN2022/114926, filed Aug. 25, 2022, which claims priority to Chinese patent application No. 202111402943.3 filed Nov. 24, 2021. The contents of these applications are incorporated herein by reference in their entirety.

TECHNICAL FIELD

The present disclosure belongs to the technical field of battery anode materials, and particularly relates to a method for preparing a copper-based anode material from a waste battery.

BACKGROUND

With rapid update of electronic products and rapid development of power automobiles, more waste lithium ion batteries are generated. The waste lithium ion batteries contain a large number of toxic and hazardous substances and thus will cause serious harm to the environment and human health. In addition, the waste lithium ion batteries contain abundant valuable metals and can be used as an important secondary resource, such that recycling of the waste lithium ion batteries becomes a hot spot of global attention.

Desorption of electrode powder during the battery recycling has been troubling. Since cathode and anode powders are coated and pressed on a current collector through an effect of an adhesive, high-efficient separation of the cathode and anode powders and the current collector is realized mainly through the two aspects: firstly, a metal foil of the current collector is damaged, such that an active substance loses a bearing object; and secondly, a structure of the adhesive is destroyed to lose a bonding effect.

At present, the current collector and an active material of a lithium ion battery anode plate are separated by a crushing-air flow separation method, but the separation method is relatively complex and has high a requirement on equipment. There are also an alkaline leaching method and an adhesive-dissolving method by N-methyl pyrrolidone. However, a large amount of chemical reagents are needed to be consumed, cost is high and the used N-methyl pyrrolidone is expensive and pollutes the environment due to high volatility.

SUMMARY

The present disclosure is intended to solve at least one of the technical problems existing in the existing technology. For this reason, the present disclosure provides a method for preparing a copper-based anode material from a waste battery. The method can conveniently recycle anode powder on an anode plate of a waste battery without polluting the environment.

The technical objective of the present disclosure is achieved by means of the following technical solution:

A method for preparing a copper-based anode material from a waste battery includes the following steps: (1) disassembling a waste battery and taking out an anode plate; (2) using the anode plate in step (1) as an anode and taking a copper foil current collector as a cathode, and placing the anode and the cathode in an electroplating solution for electroplating; (3) after the electroplating is completed, collecting anode powder separated from the anode and soaking the copper foil current collector in an acid solution; (4) washing and drying the soaked copper foil current collector; and (5) calcinating the copper foil current collector to obtain a copper-based anode material.

Preferably, the electroplating solution may include a hypophosphite ion and a nickel ion.

Preferably, the electroplating solution may include components with the following concentrations: 12-32 g/L of nickel sulfate, 11-32 g/L of sodium hypophosphite, 12-27 g/L of citric acid, 8-29 g/L of ammonium bifluoride, 0.0002-0.0012 g/L of thiourea, 0.01-0.05 g/L of sodium lauryl sulfate and 0.08-0.35 g/L of copper sulfate.

Preferably, pH of the electroplating solution may be adjusted to 6.5-7.0 and the electroplating may be conducted at a current density of 1-2 A/dm$^2$ and a temperature of 80-85° C. for an electroplating time of 0.5-2 h.

Preferably, the electroplating solution may include components with the following concentrations: 27-40 g/L of nickel sulfate, 0.2-1.5 g/L of copper sulfate, 25-30 g/L of sodium hypophosphite, 8-10 g/L of sodium acetate, 25-30 g/L of sodium citrate and 8-10 g/L of succinic acid.

Preferably, pH of the electroplating solution may be adjusted to 5.8-6.4 and the electroplating may be conducted at a current density of 1-2 A/dm$^2$ and a temperature of 80-90° C. for an electroplating time of 0.5-2 h.

Preferably, during an electroplating process, the nickel sulfate and the sodium hypophosphite may be continuously added to the electroplating solution to maintain concentrations of the nickel sulfate and the sodium hypophosphite in the electroplating solution.

Preferably, in step (3), the acid solution may be at least one of hydrochloric acid and sulfuric acid and may have a concentration of 0.05-1.0 mol/L, and the soaking may be conducted for 1-48 h.

Preferably, in step (4), the drying may be conducted in vacuum at 50-90° C. for 2-6 h.

Preferably, in step (5), the calcinating may be conducted as follows: heating the dried copper foil current collector under isolation of oxygen to 400-800° C. at a heating rate of 2-5° C./min and keeping the temperature for 2-4 h.

Preferably, in step (3), the collected anode powder may be washed with deionized water, then washed with ethanol, then dried and directly used as an anode material.

The present disclosure has the following beneficial effects:

(1) In the method for preparing a copper-based anode material from a waste battery of the present disclosure, an anode plate of a waste battery is used as an anode, a new copper foil current collector is used as a cathode, and an electroplating is conducted in an alloy electroplating solution containing nickel and phosphorus; in one aspect, a copper foil in the anode plate of the waste battery on the anode is dissolved such that anode powder on the anode plate is separated; in another aspect, three elements of nickel, copper and phosphorus are deposited on the cathode and a nickel-copper-phosphorus electroplated alloy is prepared and can be directly used as a battery anode, such that the anode powder on the anode plate of the waste battery can be conveniently recycled without polluting the environment;

(2) In the method for preparing a copper-based anode material of the present disclosure, during an electroplating process, a part of anode powder is separated and deposited in an electroplating solution, the anode powder is collected, washed and then dried and can be directly used as an anode material, such that the anode material is convenient to recycle;

(3) In the method for preparing a copper-based anode material of the present disclosure, after the electroplating is completed, the copper foil current collector is subjected to dealloying by acid soaking, such that the material on the copper foil current collector is in a nano-porous structure; and when used as an anode material, the copper-based anode material can reduce adverse effects caused by volume expansion and improve a cycle performance of the materials; and (4) In the method for preparing a copper-based anode material of the present disclosure, after the acid soaking is completed, an amorphous alloy material is crystallized through calcination to form a more stable crystal structure with a uniform morphology, such as cuprous phosphide/nickel and the like, such that a cycle performance of the material can be further improved and conductivity of the material can be improved by excessive copper in the alloy.

BRIEF DESCRIPTION OF DRAWINGS

FIG. 1 is a scanning electron microscopy (SEM) image of a copper-based anode material prepared in Embodiment 1.

DETAILED DESCRIPTION

The present disclosure is further described below with reference to specific embodiments.

Embodiment 1

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 12 g/L of nickel sulfate, 32 g/L of sodium hypophosphite, 27 g/L of citric acid, 29 g/L of ammonium bifluoride, 0.0012 g/L of thiourea, 0.05 g/L of sodium lauryl sulfate and 0.35 g/L of copper sulfate, pH of the electroplating solution was adjusted to 6.5 by using ammonia when electroplating, the electroplating was conducted at a current density of 2 $A/dm^2$ and a temperature of 80-85° C. for an electroplating time of 0.5 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a hydrochloric acid solution with a concentration of 0.05 mol/L for 10 h;
(4) the soaked copper foil current collector was washed with deionized water and the washed copper foil current collector was dried in vacuum at 50° C. for 6 h; and
(5) the dried copper foil current collector was placed in a tube furnace to be heated under isolation of oxygen to 400° C. at a heating rate of 2° C./min, the temperature was kept for 4 h and thus a copper-based anode material was obtained.

Embodiment 2

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 32 g/L of nickel sulfate, 11 g/L of sodium hypophosphite, 12 g/L of citric acid, 8 g/L of ammonium bifluoride, 0.0002 g/L of thiourea, 0.01 g/L of sodium lauryl sulfate and 0.08 g/L of copper sulfate, pH of the electroplating solution was adjusted to 7 by using ammonia when electroplating, the electroplating was conducted at a current density of 1 $A/dm^2$ and a temperature of 80-85° C. for an electroplating time of 2 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a sulfuric acid solution with a concentration of 1 mol/L for 48 h;
(4) the soaked copper foil current collector was washed with deionized water and the washed copper foil current collector was dried in vacuum at 90° C. for 2 h; and
(5) the dried copper foil current collector was placed in a tube furnace to be heated under isolation of oxygen to 800° C. at a heating rate of 5° C./min, the temperature was kept for 4 h and thus a copper-based anode material was obtained.

Embodiment 3

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 30 g/L of nickel sulfate, 25 g/L of sodium hypophosphite, 22 g/L of citric acid, 23 g/L of ammonium bifluoride, 0.001 g/L of thiourea, 0.03 g/L of sodium lauryl sulfate and 0.25 g/L of copper sulfate, pH of the electroplating solution was adjusted to 6.8 by using ammonia when electroplating, the electroplating was conducted at a current density of 1.5 $A/dm^2$ and a temperature of 80-85° C. for an electroplating time of 1 h, and during an electroplating process, the nickel sulfate and the sodium hypophosphite were continuously added to the electroplating solution to maintain concentrations of the nickel sulfate and the sodium hypophosphite in the electroplating solution;

(3) after the electroplating was completed, anode powder separated from the anode was collected and the copper foil current collector was soaked in a sulfuric acid solution with a concentration of 0.6 mol/L for 24 h;
(4) the soaked copper foil current collector was washed with deionized water and the washed copper foil current collector was dried in vacuum at 65° C. for 5 h; and
(5) the dried copper foil current collector was placed in a tube furnace to be heated under isolation of oxygen to 600° C. at a heating rate of 3° C./min, the temperature was kept for 3 h and thus a copper-based anode material was obtained.

Embodiment 4

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 27 g/L of nickel sulfate, 1.5 g/L of copper sulfate, 30 g/L of sodium hypophosphite, g/L of sodium acetate, 30 g/L of sodium citrate and 10 g/L of succinic acid, pH of the electroplating solution was adjusted to 5.8 by using ammonia when electroplating, the electroplating was conducted at a current density of 1.5 A/dm$^2$ and a temperature of 80-90° C. for an electroplating time of 0.5 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a hydrochloric acid solution with a concentration of 0.5 mol/L for 24 h;
(4) the soaked copper foil current collector was washed with deionized water and the washed copper foil current collector was dried in vacuum at 70° C. for 4 h; and
(5) the dried copper foil current collector was placed in a tube furnace to be heated under isolation of oxygen to 600° C. at a heating rate of 3° C./min, the temperature was kept for 3 h and thus a copper-based anode material was obtained.

Embodiment 5

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 40 g/L of nickel sulfate, 0.2 g/L of copper sulfate, 25 g/L of sodium hypophosphite, 8 g/L of sodium acetate, 25 g/L of sodium citrate and 8 g/L of succinic acid, pH of the electroplating solution was adjusted to 6.4 by using ammonia when electroplating, the electroplating was conducted at a current density of 1 A/dm$^2$ and a temperature of 80-90° C. for an electroplating time of 2 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a sulfuric acid solution with a concentration of 0.05 mol/L for 48 h;
(4) the soaked copper foil current collector was washed with deionized water and the washed copper foil current collector was dried in vacuum at 50° C. for 6 h; and
(5) the dried copper foil current collector was placed in a tube furnace to be heated under isolation of oxygen to 800° C. at a heating rate of 5° C./min, the temperature was kept for 2 h and thus a copper-based anode material was obtained.

Embodiment 6

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 29 g/L of nickel sulfate, 1 g/L of copper sulfate, 28 g/L of sodium hypophosphite, 9 g/L of sodium acetate, 28 g/L of sodium citrate and 9 g/L of succinic acid, pH of the electroplating solution was adjusted to 6 by using ammonia when electroplating, the electroplating was conducted at a current density of 2 A/dm$^2$ and a temperature of 80-90° C. for an electroplating time of 1 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a sulfuric acid solution with a concentration of 1 mol/L for 1 h;
(4) the soaked copper foil current collector was washed with deionized water and the washed copper foil current collector was dried in vacuum at 90° C. for 2 h; and
(5) the dried copper foil current collector was placed in a tube furnace to be heated under isolation of oxygen to 400° C. at a heating rate of 2° C./min, the temperature was kept for 4 h and thus a copper-based anode material was obtained.

Comparative Example 1

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 25 g/L of sodium hypophosphite, 22 g/L of citric acid, 23 g/L of ammonium bifluoride, 0.001 g/L of thiourea, 0.03 g/L of sodium lauryl sulfate and 0.25 g/L of copper sulfate, pH of the electroplating solution was adjusted to 6.8 by using ammonia when electroplating, the electroplating was conducted at a current density of 1.5 A/dm$^2$ and a temperature of 80-85° C. for an electroplating time of 1 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a sulfuric acid solution with a concentration of 0.6 mol/L for 24 h;
(4) the soaked copper foil current collector was washed with deionized water and the washed copper foil current collector was dried in vacuum at 65° C. for 5 h; and
(5) the dried copper foil current collector was placed in a tube furnace to be heated under isolation of oxygen to 600° C. at a heating rate of 3° C./min, the temperature was kept for 3 h and thus a copper-based anode material was obtained.

Comparative Example 2

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 30 g/L of nickel sulfate, 22 g/L of citric acid, 23 g/L of ammonium bifluoride, 0.001 g/L of thiourea, 0.03 g/L of sodium lauryl sulfate and 0.25 g/L of copper sulfate, pH of the electroplating solution was adjusted to 6.8 by using ammonia when electroplating, the electroplating was conducted at a current density of 1.5 A/dm$^2$ and a temperature of 80-85° C. for an electroplating time of 1 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was soaked in a sulfuric acid solution with a concentration of 0.6 mol/L for 24 h;
(4) the soaked copper foil current collector was washed with deionized water and the washed copper foil current collector was dried in vacuum at 65° C. for 5 h; and
(5) the dried copper foil current collector was placed in a tube furnace to be heated under isolation of oxygen to 600° C. at a heating rate of 3° C./min, the temperature was kept for 3 h and thus a copper-based anode material was obtained.

Comparative Example 3

A method for preparing a copper-based anode material from a waste battery included the following steps:
(1) a waste battery was disassembled and an anode plate was taken out and washed for later use;
(2) the anode plate in step (1) was used as an anode, a new copper foil current collector was used as a cathode, the anode and the cathode were placed in an electroplating solution for electroplating, where the electroplating solution included components with the following concentrations: 30 g/L of nickel sulfate, 25 g/L of sodium hypophosphite, 22 g/L of citric acid, 23 g/L of ammonium bifluoride, 0.001 g/L of thiourea, 0.03 g/L of sodium lauryl sulfate and 0.25 g/L of copper sulfate, pH of the electroplating solution was adjusted to 6.8 by using ammonia when electroplating, the electroplating was conducted at a current density of 1.5 A/dm$^2$ and a temperature of 80-85° C. for an electroplating time of 1 h, and during an electroplating process, the nickel sulfate and the sodium hypophosphite were continuously added to the electroplating solution to maintain concentrations of the nickel sulfate and the sodium hypophosphite in the electroplating solution;
(3) after the electroplating was completed, anode powder separated from the anode was collected and the copper foil current collector was washed with deionized water and soaked for 24 h;
(4) the soaked copper foil current collector was taken out to be dried in vacuum at 65° C. for 5 h; and
(5) the dried copper foil current collector was placed in a tube furnace to be heated under isolation of oxygen to 600° C. at a heating rate of 3° C./min, the temperature was kept for 3 h and thus a copper-based anode material was obtained.

Experiment

The morphology of the copper-based anode material prepared in Embodiment 1 was observed through a scanning electron microscope and the result was shown in FIG. 1.

The copper-based anode material prepared in Embodiments 1-6 and Comparative examples 1-3 were taken and respectively assembled into lithium-ion half batteries. A cycle performance was tested at a high current density of 260 mA/g and a working voltage range of 0.01-2.5 V. The results were shown in Table 1.

TABLE 1

| | Battery cycle performance | | | | |
|---|---|---|---|---|---|
| Item | Mass of copper foil current collector before electroplating (g) | Mass of copper foil current collector after electroplating (g) | Initial gram capacity (mAh·g$^{-1}$) | Gram capacity after 200 cycles (mAh·g$^{-1}$) | Battery gram capacity loss rate (%) |
| Embodiment 1 | 13.5 | 26.3 | 292.9 | 267.5 | 8.67 |
| Embodiment 2 | 13.5 | 26.5 | 293.8 | 266.3 | 9.36 |

TABLE 1-continued

Battery cycle performance

| Item | Mass of copper foil current collector before electroplating (g) | Mass of copper foil current collector after electroplating (g) | Initial gram capacity (mAh · g$^{-1}$) | Gram capacity after 200 cycles (mAh · g$^{-1}$) | Battery gram capacity loss rate (%) |
|---|---|---|---|---|---|
| Embodiment 3 | 13.5 | 27.8 | 302.3 | 278.2 | 7.97 |
| Embodiment 4 | 13.5 | 26.4 | 295.2 | 268.3 | 9.11 |
| Embodiment 5 | 13.5 | 26.8 | 296.3 | 270.2 | 8.81 |
| Embodiment 6 | 13.5 | 27.3 | 295.3 | 271.6 | 8.03 |
| Comparative example 1 | 13.5 | 22.8 | 165.9 | 122.6 | 26.1 |
| Comparative example 2 | 13.5 | 23.5 | 166.3 | 125.9 | 24.3 |
| Comparative example 3 | 13.5 | 25.9 | 183.9 | 152.3 | 17.2 |

It can be seen from FIG. 1 that the copper-based anode material prepared by the method of the present disclosure exhibits a regular nanoporous surface and a uniform crystal structure.

It can be seen from Table 1 that the lithium-ion half batteries assembled by the copper-based anode material prepared by the method of the present disclosure had an initial gram capacity of 292.9 mAh·g$^{-1}$ or more, had a battery gram capacity of 266.3 mAh·g$^{-1}$ or more after 200 cycles, and had a maximum battery gram capacity loss rate of only 9.36%.

Comparing Embodiment 3 and Comparative examples 1-2, it can be seen that under the premise that other conditions remain unchanged, when one of nickel sulfate and sodium hypophosphite was lacking in the electroplating solution, after the finally prepared copper-based anode material was assembled into the lithium-ion half batteries, the initial gram capacity of the batteries would be greatly reduced and the battery gram capacity loss rate was relatively large after 200 cycles.

Comparing Embodiment 3 and Comparative Example 3, it can be seen that under the premise that other conditions remain unchanged, a copper foil current collector was not soaked in an acid after the electroplating was completed, a performance of the finally prepared copper-based anode material would be greatly affected.

The above embodiments are preferred implementations of the present disclosure. However, the implementations of the present disclosure are not limited by the above embodiments. Any change, modification, substitution, combination and simplification made without departing from the essence and principle of the present disclosure should be an equivalent replacement manner, and all are included in a protection scope of the present disclosure.

The invention claimed is:

1. A method for preparing a copper-based anode material from a waste battery, comprising the following steps:
    (1) disassembling the waste battery and taking out an anode plate;
    (2) placing the anode plate in step (1) as an anode and a copper foil current collector as a cathode in an electroplating solution for electroplating;
    (3) after the electroplating is completed, collecting anode powder separated from the anode, and soaking the copper foil current collector in an acid solution;
    (4) washing and drying the soaked copper foil current collector; and
    (5) calcinating the dried copper foil current collector to obtain the copper-based anode material;
    wherein the electroplating solution is one of electroplating solution A and electroplating solution B; the electroplating solution A comprises components with the following concentrations: 12-32 g/L of nickel sulfate, 11-32 g/L of sodium hypophosphite, 12-27 g/L of citric acid, 8-29 g/L of ammonium bifluoride, 0.0002-0.0012 g/L of thiourea, 0.01-0.05 g/L of sodium lauryl sulfate and 0.08-0.35 g/L of copper sulfate; and the electroplating solution B comprises components with the following concentrations: 27-40 g/L of nickel sulfate, 0.2-1.5 g/L of copper sulfate, 25-30 g/L of sodium hypophosphite, 8-10 g/L of sodium acetate, 25-30 g/L, of sodium citrate and 8-10 g/L of succinic acid.

2. The method for preparing the copper-based anode material from the waste battery according to claim 1, wherein, when the electroplating solution is the electroplating solution A, pH of the electroplating solution is adjusted to 6.5-7.0 and the electroplating is conducted at a current density of 1-2 A/dm$^2$ and a temperature of 80-85° C. for an electroplating time of 0.5-2 h.

3. The method for preparing the copper-based anode material from the waste battery according to claim 1, wherein, when the electroplating solution is the electroplating solution B, pH of the electroplating solution is adjusted to 5.8-6.4 and the electroplating is conducted at a current density of 1-2 A/dm$^2$ and a temperature of 80-90° C. for an electroplating time of 0.5-2 h.

4. The method for preparing the copper-based anode material from the waste battery according to claim 2, wherein, during the electroplating, the nickel sulfate and the sodium hypophosphite are continuously added to the electroplating solution to maintain concentrations of the nickel sulfate and the sodium hypophosphite in the electroplating solution.

5. The method for preparing the copper-based anode material from the waste battery according to claim 1, wherein, in step (3), the acid solution is at least one of hydrochloric acid and sulfuric acid and has a concentration of 0.05-1.0 mol/L, and the soaking is conducted for 1-48 h.

6. The method for preparing the copper-based anode material from the waste battery according to claim 1, wherein, in step (4), the drying is conducted in vacuum at 50-90° C. for 2-6 h.

7. The method for preparing the copper-based anode material from the waste battery according to claim 1, wherein in step (5), the calcinating is conducted as follows:

heating the dried copper foil current collector under isolation of oxygen to 400-800° C. at a heating rate of 2-5° C./min and keeping the temperature for 2-4 h.

8. The method for preparing the copper-based anode material from the waste battery according to claim 3, wherein, during the electroplating, the nickel sulfate and the sodium hypophosphite are continuously added to the electroplating solution to maintain concentrations of the nickel sulfate and the sodium hypophosphite in the electroplating solution.

* * * * *